(12) United States Patent
Funakoshi et al.

(10) Patent No.: US 6,667,853 B2
(45) Date of Patent: Dec. 23, 2003

(54) HOLDING STRUCTURE OF INDICATING DISPLAY DEVICE FOR RECORDING MEDIUM DRIVE, AND RECORDING MEDIUM DRIVE

(75) Inventors: Hideaki Funakoshi, Kadoma (JP); Hironobu Takahashi, Joyo (JP)

(73) Assignee: Funai Electric Co., Ltd., Daito (JP)

( * ) Notice: Subject to any disclaimer, the term of this patent is extended or adjusted under 35 U.S.C. 154(b) by 188 days.

(21) Appl. No.: 09/950,797

(22) Filed: Sep. 13, 2001

(65) Prior Publication Data

US 2002/0030934 A1 Mar. 14, 2002

(30) Foreign Application Priority Data

Sep. 13, 2000 (JP) ........................................ 2000-277660

(51) Int. Cl.[7] ............................................... G11B 5/012
(52) U.S. Cl. ..................................... 360/137; 369/75.1
(58) Field of Search ........................... 360/97.01, 97.02, 360/137; 369/30.3, 30.63, 75.1–82

(56) References Cited

FOREIGN PATENT DOCUMENTS

| JP | 63-107479 | 7/1988 |
|----|-----------|--------|
| JP | HE11-12299 | 4/1989 |
| JP | HEI8-786 | 1/1996 |
| JP | 10-207388 | 8/1998 |

*Primary Examiner*—A. J. Heinz
(74) *Attorney, Agent, or Firm*—Crowell & Moring LLP

(57) ABSTRACT

In a recording medium drive, a frame on which a deck is attached and a printed circuit board are equipped on a bottom chassis in the drive body, and an indicating display device such as a fluorescent display tube is connected to the printed circuit board and arranged at a position corresponding to a window of a front panel. Projections for locking are formed integrally to the frame, and the fluorescent display tube is caught between the front panel and the projections for locking so as to be positioned. This allows the indicating display device to be held by a simple configuration, and manhours required for manufacture to be reduced.

14 Claims, 4 Drawing Sheets

HOLDING STRUCTURE OF INDICATING DISPLAY DEVICE FOR RECORDING MEDIUM DRIVE, AND RECORDING MEDIUM DRIVE

BACKGROUND OF THE INVENTION

The present invention relates to a holding structure of an indicating display device for indicating the storing state of a recording medium and the operating state of a recording medium drive, in the recording medium drive.

Conventionally, there has been known recording medium drives in which a deck is packaged for loading a recording medium into the main frame of the drive body, and at the same time, a printed circuit board (a first printed circuit board) for controlling the whole drive is installed substantially in the approximate horizontal direction on the lower portion of the deck, and in particular, the storing state of a recording medium and the operating state of a recording medium drive can be checked by the user with an indicating display device such as a fluorescent display tube disposed within a front panel of the drive body (e.g. see Japanese Unexamined Utility Model Publication No. 63-107479 and Japanese Examined Utility Model Publication No. 8-768). In these recording medium drives, in either case, a printed circuit board (a second printed circuit board) for controlling a fluorescent display tube is disposed such that it is allowed to stand up substantially in the approximate vertical direction in front of the main frame, and in addition, the fluorescent display tube is disposed such that it is similarly allowed to stand up substantially in the approximate vertical direction in front of the second printed circuit board. The fluorescent display tube is held by an engaging member such as a hook and a bearer which are extended from the main frame and penetrates a through hole provided in the printed circuit board.

Such recording medium drives have the first printed circuit board for controlling the whole drive and the second printed circuit board for controlling the fluorescent display tube, thereby causing the structure to become complex and the manufacturing cost to be increased. A connecting pin drawn downwards in the vertical direction from the lower end of the fluorescent display tube is required to be bent at an angle of approximate 90 degrees in the horizontal direction in order to be electrically connected to the printed circuit board, thereby causing the process of manufacturing the fluorescent display tube to become complex, and the manufacturing cost of the whole drive to be increased.

Thus, there has been proposed a recording medium drive in which the printed circuit board attached to the lower portion of a deck for loading a recording medium is allowed to be extended to a position below the fluorescent display tube, and in which the circuit is configured such that the printed circuit board for controlling the whole drive is integrated with the printed circuit board for controlling the fluorescent display tube (e.g. see Japanese Unexamined Patent Publication No. 10-207388).

In the recording medium drive, the fluorescent display tube is held in such a manner that it is caught between the front and rear sides thereof by projections upstanding upwards on the bottom of the drive body and projections provided on the inner surface in front of the drive body. Although here the printed circuit board is provided between the bottom of the drive body and the fluorescent display tube, a through hole is provided at a position corresponding to the projections for locking the printed circuit board, and by inserting the projections for locking through the through hole, a locking portion of the projections for locking can be formed on the rearward side of the fluorescent display tube. However, in such recording medium drives, as described above, since a through hole must be provided in the printed circuit board, a trouble may be developed in forming the wiring patterns of the printed circuit board. In particular, the through hole is formed below the fluorescent display tube because it is allowed to correspond to the position of the projection for locking the fluorescent display tube, so that it becomes considerably difficult to form the wiring pattern which is connected to the connecting pin drawn below the fluorescent display tube.

Further, there has been proposed a holding structure of the fluorescent display tube for catching the upper portion of the fluorescent display tube located on the printed circuit board between the projections for locking (e.g. see a prior art example described in Japanese Examined Utility Model Publication No. 1-12299). However, this holding structure of the fluorescent display tube has a structure in which the projections for locking are fixed to a part of the frame by using machine screws, so that machine screw tightening requires manhours, and thus it is difficult to reduce the manufacturing cost.

Thus, there has been proposed a holding structure of the fluorescent display tube for holding the fluorescent display tube by fitting the projections for locking formed on the upper end of the fluorescent display tube into the front panel (e.g. see Japanese Examined Utility Model Publication No. 1-12299). In such holding structure of the fluorescent display tube, where an opening and a mechanism for loading a recording medium are provided above the fluorescent display tube, the projections for locking must be fitted through a gap between the fluorescent display tube and the mechanism, so that the manufacturing process involves a considerable difficulty. There is also a restriction in the procedure of manufacturing process in that the front panel must be attached before an armored case is attached.

SUMMARY OF THE INVENTION

The present invention is made to solve the problems described above and the object of the invention is to provide an installation structure of the fluorescent display tube which makes the manufacturing cost small by a simple structure and a reduction of manhours for manufacture, and makes possible the miniaturization of the drive body, and to provide a recording medium drive using the installation structure.

The present invention is a holding structure of an indicating display device for a recording medium drive comprising a deck installed in the drive body for loading a recording medium, one printed circuit board attached on the lower portion of the deck for controlling the drive, a chassis on which the deck and the printed circuit board are equipped, a front panel which has an opening for moving the recording medium into and out of the deck and a window located below the opening for seeing through the inside of the drive body and which is attached onto the front of the drive body, and an indicating display device, which is electrically connected to the printed circuit board and disposed at a position inside the front panel and corresponding to the above-mentioned window, for indicating the storing state of the recording medium and the operating state of the drive, wherein locking projections are formed integrally on the frame for mounting the deck in the drive body, and the indicating display device is positioned by the projections for locking.

In the configuration described above, the whole drive and the indicating display device are integrally controlled by the one printed circuit board, thereby making the configuration simple and contributing to reduced manufacturing costs. In mounting the deck in the drive body, a structure is employed in which the indicating display device is held by the projections for locking integrally formed on the frame of the deck, whereby the positioning and holding of the indicating display device can be easily performed by a simple structure.

In the installing structure described above, the printed circuit board and deck are attached substantially in an approximate horizontal direction to a chassis, and the recording medium is moved in the approximate horizontal direction into and out of the front of the drive body. In this configuration, the deck for loading the recording medium is normally arranged below and at the inner part of the opening of which the recording medium is moved into and out, so that disposing the indicating display device on the front of the deck allows the miniaturization of the drive to be realized. The indicating display device can be caught between the front panel and the projections for locking.

The projections for locking may be formed in correspondence with the side in the rear of the indicating display device. In this configuration, the indicating display device is held to be caught between the front and rear sides by the projections for locking formed on the side in the rear of the indicating display device and the front panel of the drive body.

It is sufficient that the frame is molded with a resin material. The projection for locking can be formed in correspondence with both side ends of the indicating display device. In this configuration, the indicating display device is held to be caught between the right and left sides by the projections for locking formed at the both ends of the indicating display device.

It is sufficient that the projections for locking have a concavity into which both side ends of the indicating display device are fit.

Further, the projections for locking can be formed in correspondence with the upper end portion of the indicating display device. In this configuration, the indicating display device is held to be caught between the upper and lower sides by both the projections for locking formed at the upper end portion of the indicating display device and the connecting pin which is drawn from the lower end of the indicating display device and connected to the printed circuit board.

The projections for locking can have a concavity into which the upper end portion of the indicating display device is fit. The indicating display device is a fluorescent display tube.

DETAILED DESCRIPTION OF THE PREFERRED EMBODIMENTS (Embodiment 1)

Figure 1:
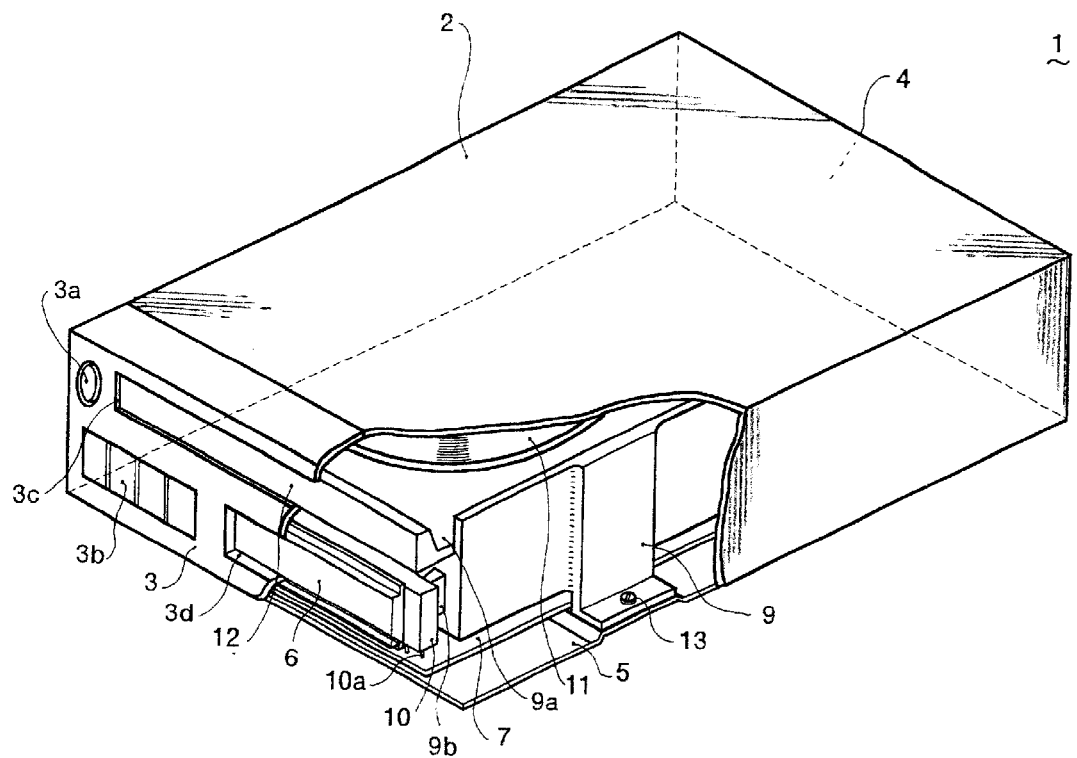
FIG. 1 is a perspective view showing the schematic configuration of an optical disc drive being one embodiment of a recording medium drive of the present invention.
Figure 2A:
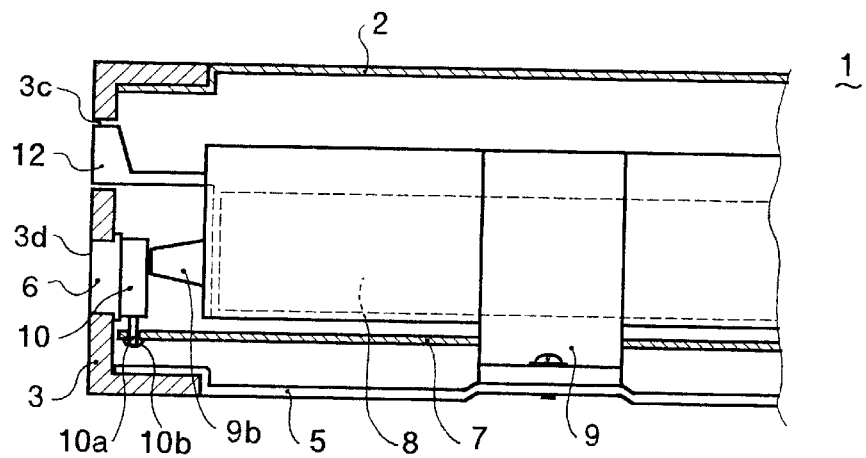
FIG. 2(a) is a side sectional view showing the holding structure of an indicting display device in the optical disc drive.
Figure 2B:
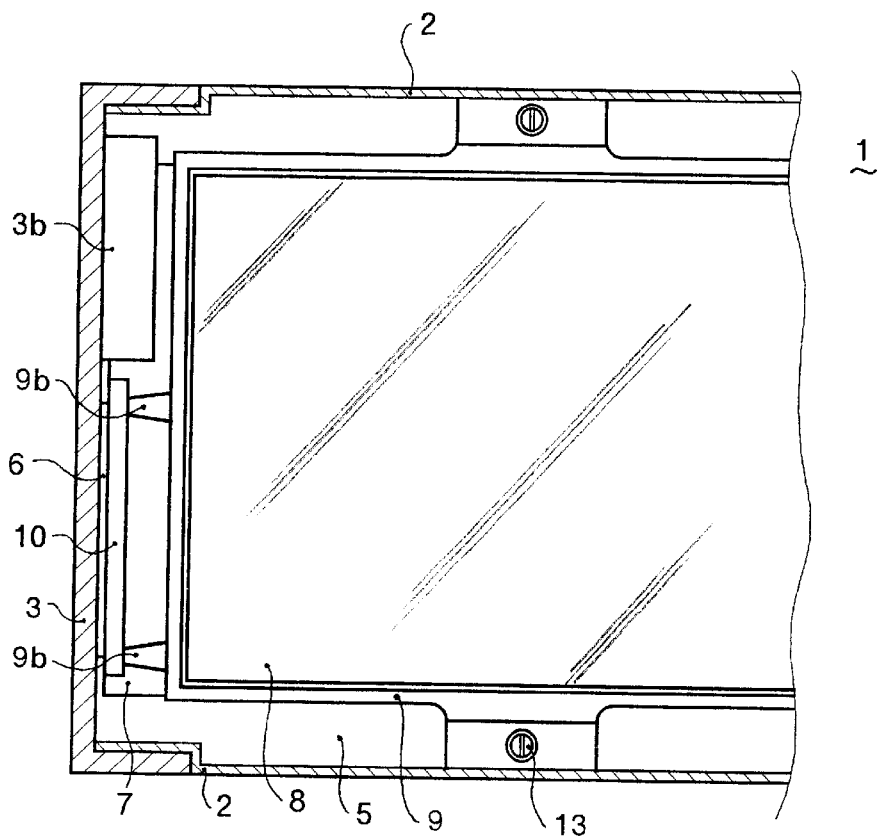
FIG. 2(b) is a plane sectional view thereof.

Hereinafter, an optical disc drive being one embodiment embodying the present invention will be explained with reference to drawings. FIG. 1, FIGS. 2(a) and 2(b) show the schematic configuration of an optical disc drive of the present invention. The optical disc drive 1 is configured in the appearance thereof with an armored case 2, a front panel 3, a back panel 4 and a bottom chassis 5. The armored case 2 is formed in a manner to surround the right/left sides and the upper side of the drive.

The front panel 3 is attached onto the front of the drive, and includes a power switch 3a for turning on/off the main power source of the drive, an operating switch 3b for operating the action of the drive, and is provided with an opening 3c through which an optical disc (recording media) 11 is moved into and out thereof, and a window 3d below the opening 3c for seeing into the inside of the drive. The window 3d is attached with a shield 6 made by a transparent or translucent resin molding material and the like, thereby allowing the inside of the drive to be seen, as described above, and preventing dust and the like from intruding therein from the outside. A configuration in which the operating switch 3b is omitted from the front panel 3 may be employed where the operation of the drive is performed by a remote controller or a personal computer.

On the other hand, connecting terminals for connecting with interfaces of an amplifier, a regenerating speaker, a regenerating display, a personal computer or the like are provided in the back panel 4 (not shown). These connecting terminals may be provided onto the front panel 3 so as to facilitate the connection.

Further, the bottom chassis 5 is equipped approximately horizontally with a printed circuit board 7 in which a control circuit of the drive is contained, and with a frame 9 attached with a deck 8 (see FIG. 2) for loading the optical disc 11. The printed circuit board 7 is configured by an electronic circuit in which recording means such as CPU and memory are contained, and the CPU executes the control of the drive based on the program previously stored on the recording means. The printed circuit board 7 is mounted with an indicating display device, in upstanding condition, including a flat-plate-shaped fluorescent display tube 10 and the like for indicating the storing state of the optical disc 11 and the operating state of the drive at a position corresponding to the window 3d provided onto the front panel 3. As an indicating display device, other than the fluorescent display tube, an LED (Light Emitting Diode) board, a liquid crystal board and the like may be used. The fluorescent display tube 10 is connected electrically by a connecting pin 10a drawn in the vertical direction below the lower end thereof to the printed circuit board 7. The electrical connection may be performed by soldering 10b as shown in FIG. 2(a), or may be performed by providing a connecting terminal, though not shown, corresponding to the connecting pin 10a on the board, and fitting the connecting pin 10a into the connecting terminal.

In this way, in the optical disc drive 1, the deck 8 of the drive and the fluorescent display tube 10 can be integrally controlled by the printed circuit board 7 without separately providing the printed circuit board 7 for controlling the fluorescent display tube 10, thereby allowing the configuration of the optical disc drive 1 to be simplified and the manufacturing cost to be reduced. The fluorescent display tube 10 in upstanding condition is mounted to the printed circuit board 7, and is electrically connected by the connecting pin 10a drawn from the lower end thereof toward the printed circuit board 7 to the printed circuit board 7, so that bending the connecting pin 10a is not required, thereby allowing the manufacturing manhours for the fluorescent display tube 10 to be reduced.

The deck 8 comprises a spindle motor (not shown) for driving the optical disc 11, a head (not shown) for reading the data stored on the optical disc 11 or storing the data on the optical disc 11, and the like, and the deck 8 is loaded with the optical disc 11. That is, provided on the upper portion of the deck 8 is a tray 12 for loading the optical disc 11 at a position corresponding to the opening 3c of the front panel 3, and sliding in the approximate horizontal direction the tray 12 on which the optical disc 11 is placed, allows the optical disc 11 to be loaded at a specified position on the deck 8. The method of loading the optical disc 11 is not limited to the method of placing the disc on the tray 12 to slide, but may be the method in which a mechanism for drawing the optical disc 11 is provided inside the opening 3c, the so-called slot-in method. The reading of recording data from and writing them onto the optical disc 11 are similar to those for a prior art optical disc drive, so that the explanation thereof will be omitted.

The deck 8 is loaded through the frame 9 molded with a resin material onto the bottom chassis 5. In the present invention, the opening 9a corresponding to the tray 12 is provided in front of the frame 9, and the projections for locking 9b for holding the fluorescent display tube 10 are integrally formed below thereof. In addition, in the present invention, the deck 8 is loaded by the frame 9 onto the bottom chassis 5, and the fluorescent display tube 10 is caught between the front and rear sides by the projections for locking 9b protrusively provided on the frame 9 and the front panel 3.

The procedure of holding the fluorescent display tube 10 of the present invention will be explained hereinafter. First, the printed circuit board 7 on which the fluorescent display tube 10 has been attached is loaded onto the bottom chassis 5, which is then fixed with fixtures such as machine screws (not shown). Then, after the deck 8 is attached to the frame 9 by a predetermined method such as machine-screw tightening, the frame 9 is loaded onto the bottom chassis 5 and fixed with fixtures such as machine screws 13. At this point, the fluorescent display tube 10 is supported at the side of the rear portion thereof by the projections for locking 9b protrusively provided in front of the frame 9, thereby preventing a more inclination in the rear side than required. Then, after the back panel 4 and the armored case 2 are attached to the bottom chassis 5 and fixed with fixtures such as machine screws, the front panel 3 (in which the shield 6 is provided on the window 3d) is attached to the armored case 2. At this point, the fluorescent display tube 10 has been attached to a position corresponding to the window 3d of the front panel 3 on the printed circuit board 7, so that the shield 6 is opposite to the front of the fluorescent display tube 10.

Here, previously and appropriately setting the thickness of the shield 6, the thickness of the fluorescent display tube 10, the attaching position of the printed circuit board 7, and the protruding length of the projections for locking 9b allows the fluorescent display tube 10 to be positioned and held by being caught between the front and rear sides by the shield 6 and the projections for locking 9b. Although in this embodiment, as described above, the fluorescent display tube 10 is positioned and held by being caught between the front and rear sides by the shield 6 provided on the front panel 3 and the projections for locking 9b, the fluorescent display tube 10 may be positioned and held by being caught between the front and rear sides by the inner side of the front panel 3 and the projections for locking 9b. At this point, providing projections for locking the fluorescent display tube 10 on the inner side of the front panel 3 allows the fluorescent display tube 10 to be easily positioned and held.

Although in this embodiment, after the back panel 4 and the armored case 2 are attached to the bottom chassis 5, the front panel 3 is attached, after the front panel 3 is previously attached, the back panel 4 and the armored case 2 may be attached to the bottom chassis 5. The frame material is not limited to the resin molding material, so that a metallic material such as aluminum and steel may be used as the frame material. Other configurations and operations are similar to those of prior art optical disc drives, so that the explanation thereof will be omitted.

In this embodiment as described above, there is employed a structure in which when loading the deck 8 on the bottom chassis 5, the fluorescent display tube 10 is held by the projections for locking 9b formed integrally on the frame 9 of the deck 8, so that the fluorescent display tube 10 can be easily held by the simple structure. The deck 8 is arranged below and at the inner part of the opening 3c through which the optical disc 11 is moved into and out thereof, so that disposing the fluorescent display tube 10 in front of the deck 8 allows the miniaturization of the optical disc drive 1 to be realized.

(Embodiment 2)

Figure 3A:
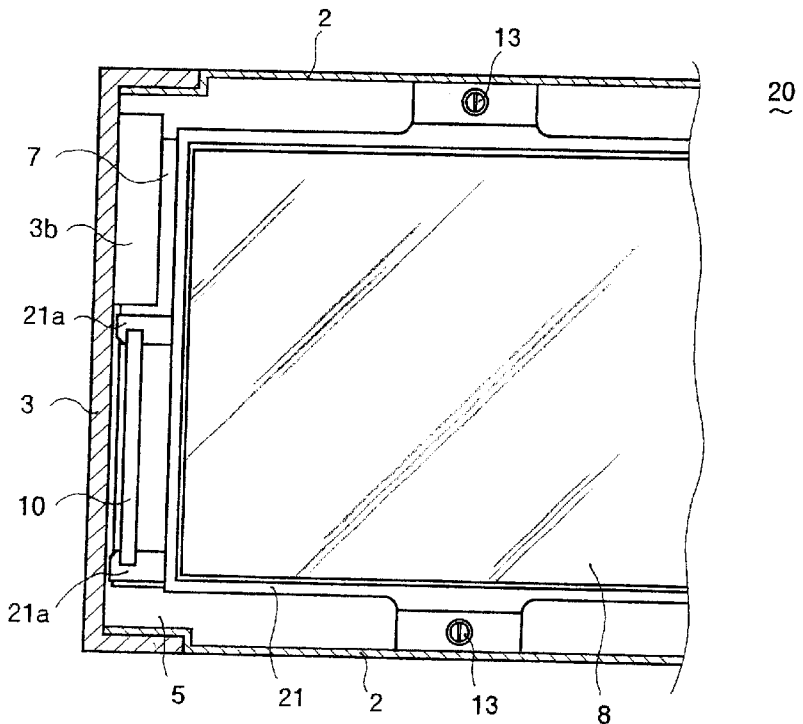
FIG. 3(a) is a plane sectional view of the optical disc drive being another embodiment of a recording medium drive of the present invention.
Figure 3B:
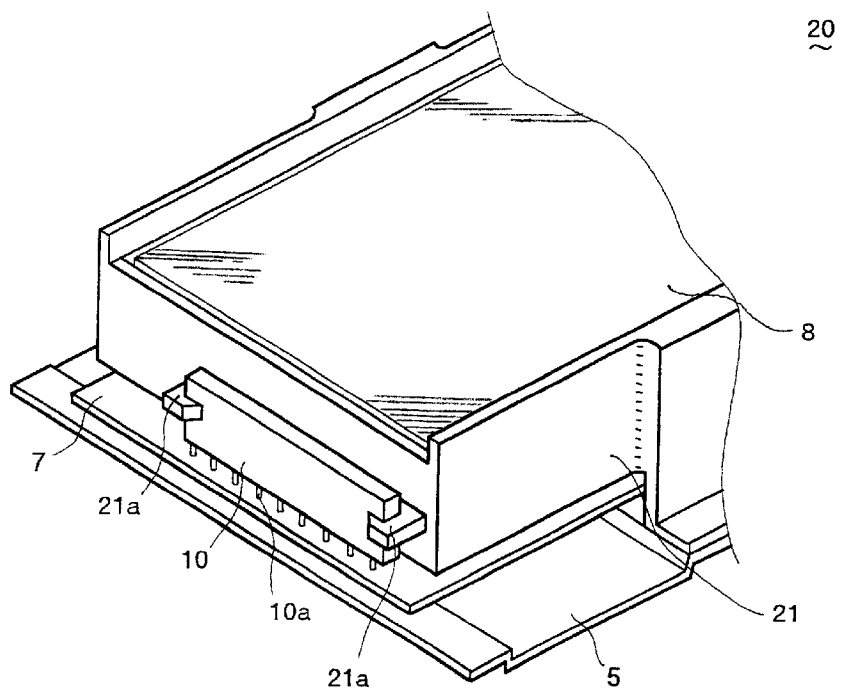
FIG. 3(b) is a perspective view showing the holding structure of an indicting display device of the drive.

FIGS. 3(a) and 3(b) show an optical disc drive according to another embodiment of the present invention. In the optical disc drive 20, the printed circuit board 7 and the frame 21 onto which the deck 8 is attached are loaded on the bottom chassis 5. Projections for Locking 21a protrusively provided in front of the frame 21 of this embodiment is provided with a concavity in correspondence with both ends of the fluorescent display tube 10. Therefore, while fitting both ends of the fluorescent display tube 10 into the concavity of the projections for locking 21a, the frame 21 is loaded on the bottom chassis 5 and then fixed with fixtures such as machine screws 13. In this way, the fluorescent display tube 10 is positioned and held by the projections for locking 21a provided on the frame 21.

In this embodiment as described above, the fluorescent display tube 10 can be held when the frame 21 is loaded, so that compared to a case where in the above-mentioned embodiment 1, the fluorescent display tube 10 is held by loading of the frame 9 and attaching of the front panel 3, even with fewer manhours, the fluorescent display tube 10 can be reliably held. Other configurations and operations are similar to those of embodiment 1, so that the explanation thereof will be omitted.

(Embodiment 3)

Figure 4A:
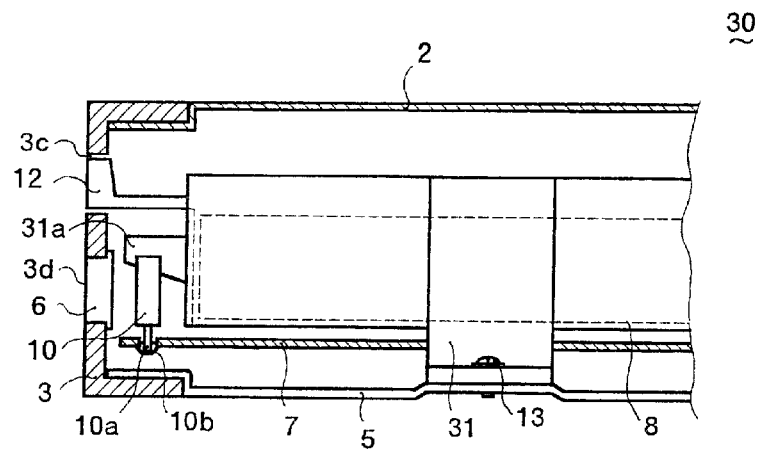
FIG. 4(a) is a side sectional view of the optical disc drive being still another embodiment of a recording medium drive of the present invention.
Figure 4B:
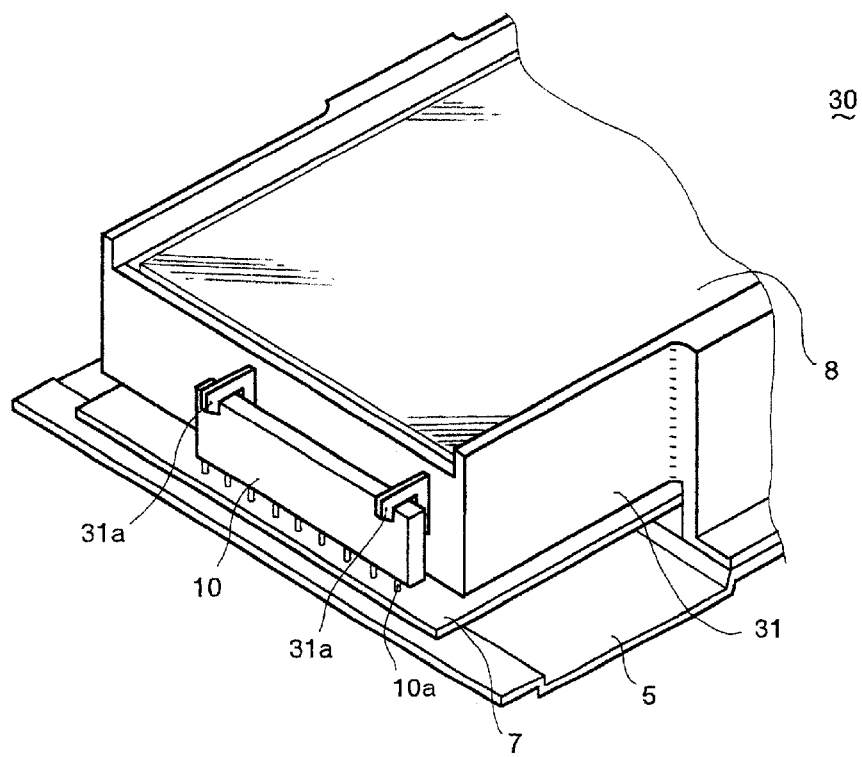
FIG. 4(b) is a perspective view showing the holding structure of an indicting display device of the drive.

FIGS. 4(a) and 4(b) show an optical disc drive according to still another embodiment of the present invention. In the optical disc drive 30, the printed circuit board 7 and the frame 31 onto which the deck 8 is attached are loaded on the bottom chassis 5. In this embodiment, projections for locking 31a protrusively provided in front of the frame 31 is provided with a concavity in correspondence with the upper end of the fluorescent display tube 10. Therefore, as is the case with the optical disc drive 20 of embodiment 2, while fitting the upper end portion of the fluorescent display tube 10 into the concavity of the projections for locking 31a, the frame 31 is loaded on the bottom chassis 5, whereby the fluorescent display tube 10 is positioned and held.

In this embodiment as described above, as is the case with embodiment 2, the fluorescent display tube 10 can be held when the frame 31 is loaded, so that compared to a case where the fluorescent display tube 10 is held by loading of the frame 9 and attaching of the front panel 3 in embodiment 1, with fewer manhours, the fluorescent display tube 10 can be reliably held. The fluorescent display tube 10 is held at the upper end portion thereof, so that compared to embodiment 2, the display width of the fluorescent display tube 10 can be widened. Other configurations and operations are similar to those of embodiment 1, so that the explanation thereof will be omitted.

The present invention is not limited to the configuration of the above-mentioned embodiments, and it is possible to modify variously, and for example, while in the above-mentioned embodiments, a configuration has been shown in which the recording medium is in the approximate horizontal direction moved into and out of the front of the drive body, even a configuration in which the recording medium is moved into and out in the vertical direction is applicable in a similar manner. The recording medium used in the present invention can be widely applied not only to disc-shaped recording medium such as CD (Compact Disc), DVD (Digital Versatile Disc), or MO (Magneto Optical Disc), but also to almost every recording medium such as tape-shaped recording medium represented by DAT (Digital Audio Tape-recorder) and the like, and card-shaped recording medium including flash memory or PC (Personal Computer) card, Memory Stick™ and the like.

What is claimed is:

1. A holding structure of an indicating display device for a recording medium drive, comprising:

a deck loadable with a recording medium;

a printed circuit board arranged below the deck for controlling the drive;

a frame for mounting the deck in the drive;

a chassis on which the deck and the printed circuit board are arranged;

a front panel having an opening which allows the recording medium to be movable into and out of the deck, and a window located below the opening for seeking into the drive, the front panel being attached onto a front of the drive; and an indicating display device electrically connected to the printed circuit board and disposed at a position behind the front panel corresponding to the window, which indicating display device indicates a strong storing state of the recording medium and an operating state of the drive;

projections for locking formed integrally on the frame in correspondence with both side ends of the indicating display device, wherein the projections for locking have a concavity into which the both side ends of said indicating display device are fit, wherein the indicating display device is positioned by the projections for locking.

2. A holding structure of an indicating display device according to claim 1, wherein the printed circuit board and deck are arranged in an approximately horizontal position relative to the chassis, and the recording medium is movable in an approximately horizontal direction into and out of the front of the drive.

3. A holding structure of an indicating display device according to claim 1, wherein the indicating display device is caught between the front panel and the projections for locking.

4. A holding structure of an indicating display device according to claim 3, wherein the projections for locking are formed in correspondence with a rearward side of the indicating display device.

5. A holding structure of an indicating display device according to claim 1, wherein the frame is molded with a resin material.

6. A holding structure of an indicating display device according to claim 1, wherein the indicating display device is a fluorescent display tube.

7. A recording medium drive having a holding structure of an indicating display device according to claim 1.

8. A holding structure of an indicating display device for a recording medium drive, comprising:

a deck loadable with a recording medium;

a printed circuit board arranged below the deck for controlling the drive;

a frame for mounting the deck in the drive;

a chassis on which the deck and the printed circuitry board are arranged;

a front panel having an opening which allows the recording medium to be movable into and out of the deck, and a window located between the opening for seeing into the drive, the front panel being attached onto a front of the drive; and an indicating display device electrically connected to the printed circuit board and disposed at a position behind the front panel corresponding to the window, which indicating display device indicates a storing state of the recording medium and an operating state of the drive;

projections for locking formed integrally on the frame in correspondence with an upper end of the indicating display device, wherein the projections for locking have a concavity into which the upper end of said indicating display device is fit, and wherein the indicating display device is positioned by the projections for locking.

9. A holding structure of an indicating display device according to claim 8, wherein the printed circuit board and deck are arranged in an approximately horizontal position relative to the chassis, and the recording medium is movable in an approximately horizontal direction into and out of the front of the drive.

10. A holding structure of an indicating display device according to claim 8, wherein the indicating display device is caught between the front panel and the projections for locking.

11. A holding structure of an indicating display device according to claim 10, wherein the projections for locking are formed in correspondence with a rearward side of the indicating display device.

12. A holding structure of an indicating display device according to claim 8, wherein the frame is molded with a resin material.

13. A holding structure of an indicating display device according to claim 8, wherein the indicating display device is a fluorescent display tube.

14. A recording medium drive having a holding structure of an indicating display device according to claim 8.

* * * * *